(12) United States Patent
Fukaya et al.

(10) Patent No.: US 7,099,264 B2
(45) Date of Patent: Aug. 29, 2006

(54) FLAT-PLATE LENS

(75) Inventors: Toshio Fukaya, Tsukuba (JP); Junji Tominaga, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 497 days.

(21) Appl. No.: 10/442,213

(22) Filed: May 21, 2003

(65) Prior Publication Data

US 2004/0047272 A1 Mar. 11, 2004

(30) Foreign Application Priority Data

May 22, 2002 (JP) ............................ 2002-147666

(51) Int. Cl.
*G11B 7/00* (2006.01)
(52) U.S. Cl. .................................. 369/284; 369/112.25
(58) Field of Classification Search ........... 369/112.25, 369/283

See application file for complete search history.

(56) References Cited

U.S. PATENT DOCUMENTS

| 4,689,873 | A | * | 9/1987 | Kramer ........................ 438/72 |
| 6,226,258 | B1 | | 5/2001 | Tominaga et al. |
| 6,391,395 | B1 | | 5/2002 | Tseng et al. |
| 6,404,722 | B1 | | 6/2002 | Tseng et al. |
| 2003/0107979 | A1 | * | 6/2003 | Kim et al. ............. 369/112.07 |

FOREIGN PATENT DOCUMENTS

| JP | 3-91128 | 4/1991 |
| JP | 11-250493 | 9/1999 |
| JP | 2002-74666 | 3/2002 |
| WO | 03/044897 A1 | 5/2003 |

OTHER PUBLICATIONS

Tominaga, J. et al., *Applied Physics Letters*, vol. 73, No. 15, p. 2078-2080 (1998).
Pendry, J.B., *Physical Review Letters*, vol. 85, No. 18, p. 3966-3969 (2000).
Kim, K. et al., *Optics Letters*, vol. 26, No. 22, p. 1800-1802 (2001).
Notomi, M., *Physical Review B*, vol. 62, No. 16, p. 10692-10705 (2000).
Fan, S. et al., *Applied Physics Letters*, vol. 65, No. 11, p. 1466-1468 (1994).
Johnson, S. et al., *Applied Physics Letters*, vol. 77, No. 22, p. 3490-3492 (2000).

* cited by examiner

*Primary Examiner*—Wayne Young
*Assistant Examiner*—Van T. Pham
(74) *Attorney, Agent, or Firm*—Wenderoth, Lind & Ponack, L.L.P.

(57) ABSTRACT

The invention discloses a flat-plate lens to be built in an optical recording medium for improving the image-forming characteristics of the recording medium. The flat-plate lens of the invention comprises a layered thin film having a periodical structure in the direction of thickness thereof corresponding to a wavelength slightly longer than the wavelength of the light used for recording and retrieving information into and from the recording medium. The thin film of a periodical structure is formed by alternate lamination of pluralities of layers two materials having different refractive indices such as a combination of $MgF_2$ and ZnS. When the thin film having such a periodical structure is formed with good uniformity allover the surface, the image-forming performance on the recording layer can be uniform irrespective of the position on the flat-plate lens.

4 Claims, 3 Drawing Sheets

«FLAT-PLATE LENS»

BACKGROUND OF THE INVENTION

The present invention relates to a flat-plate lens suitable for use within an optical path from a light source to the recording layer or from the recording layer to an optical detector for conducting recording of information or retrieving of the recorded information by utilizing optical means. The flat-plate lens exhibits uniformly imaging performance at any position on the lens body so as to provide a high-density optical recording method and a high-density optical recording medium by utilizing the method.

In recent years, optical recording media are highlighted as a recording medium to play an indispensable role among various recording media in the information-predominant society by virtue of their excellent performance for recording and retrieving information in a high density at a high velocity. Several types of optical recording media are already under practical applications with a high recording density including DVD-RAM, DVD-R, DVD-RW and others.

In the optical recording of information, the density of information recording and retrieving is limited by the critical diffraction determined depending on the wavelength of the light used. As a technology for overcoming this problem of limitation, an optical recording method by utilizing near-field light has recently come to be highlighted. Existence of the near-field light, however, is limited to the very proximity apart by several tens of nanometers from the generation source of the near-field light with rapidly decreasing intensity as the distance from the source is increased. This matter is the largest limiting factor in the technology of optical recording by utilizing the near-field light.

A proposal is made for a so-called Super-RENS (Super Resolution Near-field Structure) with a near-field light source built in the optical recording medium enabling high-density information recording with recording marks having a diameter as small as 60 nm or even smaller. See, for example, Japanese Patent Kokai 11-250493 and Applied Physics Letters, volume 73, page 2078 (1998). A problem in this Super-RENS is that the information recording layer is adversely affected by the heat generated in the near-field light generating source even though the recording layer is isolated from the near-field light source with intervention of a protecting layer.

As a solution for this problem, a so-called perfect lens is proposed by using a material having a refractive index of −1 as a means for obtaining an image of the near-field light source. See, for example, Physical Review Letters, volume 85, page 3966 (2000). It is, however, practically a difficult matter to conduct optical recording by using such a very special material having a refractive index of −1 or a negative value.

Besides, a study is now under the way for the solution of the above problem in which a hologram recording is made of the near-field light source and the reconstructed image thereof is utilized for optical information recording. See Optics Letters, volume 26, page 1800 (2001). There would still be a very long way, however, before the study has reached a stage for practical application of the method in an actual optical recording system.

As described above, it is the present status of the optical information recording technology that no lens systems are available for obtaining optical imaging in a diameter of the image not exceeding 100 nm.

SUMMARY OF THE INVENTION

In view of the above described optical information recording technology, the present invention has an object to provide a flat-plate lens for use as built in an optical path leading to the recording layer from the light source or to the optical detector from the recording layer to accomplish a resolution of 100 nm or finer in diameter. The flat-plate lens of the invention exhibits performance of very uniform image-formation on allover the lens surface so as to accomplish optical information recording in a high density by using an optical recording medium.

The inventors have continued extensive investigations for developing a lens by utilizing the image-regenerating characteristics of holograms as a part of their comprehensive studies in the field of optical information recording method capable of recording and retrieving high-density information and, as a result, have arrived at a discovery that, in a thin film having a periodical structure, excellent image-forming characteristics can be obtained by the incidence of light having a wavelength slightly shorter than the wavelength corresponding to the frequency period of the thin film leading to the present invention based on this discovery after detailed studies on the relationship between the periodical structure and the wavelength, distance between the light source and the flat-plate lens and image-forming characteristics thereof.

Thus, the flat-plate lens of the present invention, which is used, in the optical information recording and retrieving method, within the optical path leading to the recording layer from the light source or leading to the optical detector from the recording layer, comprises a thin film layer having a periodical structure having a frequency period corresponding to a wavelength slightly longer than the wavelength of the light for use.

The aforementioned "wavelength slightly longer than the wavelength of the light for use" can be determined, for example, in terms of the refractive indices n1 and n2 and thickness values d1 and d2 of the first and second alternate layers, respectively, forming the periodical structure. As a measure, assuming n2 being larger than n1, the wavelength should be 1.0 to 1.1 times of the wavelength for use when (n2d2):(n1d1) is 10.0 or larger, 1.05 to 1.2 times of the wavelength for use when (n2d2):(n1d1) is 0.1 or smaller and 1.1 to 1.3 times of the wavelength for use when (n2d2):(n1d1) is 0.1 to 10.0.

The present invention also provides an optical information recording in a high density which comprises inserting the above defined flat-plate lens into the optical path leading to the recording layer from the light source or leading to an optical detector from the recording layer so as to form an image of the light source or an optical image with intervention of the periodical structure of the flat-plate lens with resolution of 100 nm or finer in diameter.

DETAILED DESCRIPTION OF THE PREFERRED EMBODIMENTS

Figure 1:
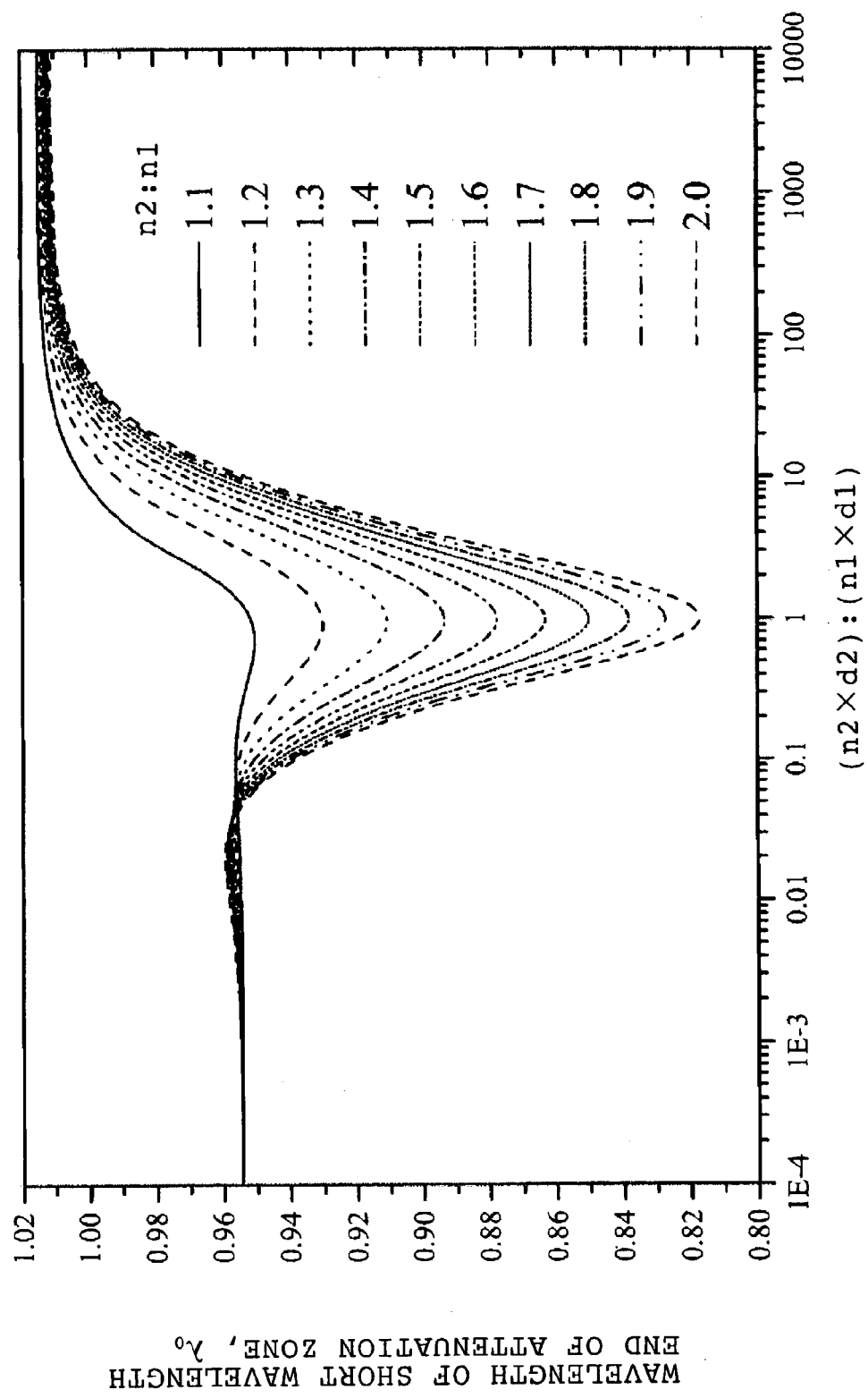
FIG. 1 is a graph showing the wavelength at the short wavelength end of the attenuation zone under various conditions by way of the ratio thereof to the wavelength λ corresponding to the periodical structure.

In the following, the present invention is described in more detail for the flat-plate lens as well as the high-density optical recording method and the optical recording medium by using the same making reference to the accompanying drawings. A key point in the present invention consists in the formation of a periodical structure. Preparation of the periodical structure can usually be performed by lamination of materials having different refractive indices or by hologram recording using a photosensitive layer formed on a substrate by coating. The substrate is not particularly limitative and any of transparent and opaque materials can be used for the purpose provided that the surface thereof is sufficiently smooth. Suitable materials of the substrates include, for example, plastic resins such as polypropylenes, acrylic resins, polycarbonates, styrene-based resins, vinyl chloride-based resins and the like, glass materials and metals such as aluminum and gallium arsenide. A glass substrate can be provided with a coating layer of a photocurable resin.

While the flat-plate lens of the invention works solely by the periodical structure thereof alone as the key function, it is optional that, when the periodical structure does not have a mechanical strength for self-supporting, a periodical structure is formed on a self-supporting base plate. In the high-density optical recording method or in the case of constituting an optical recording medium by utilizing the same as well as in characteristics evaluation of the flat-plate lens, an advantage is obtained that the light source or optical image can be disposed in the proximity of the flat-plate lens on the supporting substrate or on the periodical structure so as to facilitate confirmation of image forming when the supporting substrate or the periodical structure is provided thereon with a recording layer of a phase-change recording material, a layer bearing marks of information recording or a masking layer in the Super-RENS.

The recording material for constituting the recording layer formed on the substrate is not particularly limitative and any of those under conventional use can be used therefore including GeSbTe alloys widely used heretofore, AgInSbTe alloys having a smaller energy of crystallization and AgInSbTeV alloys having controllability of the crystallization velocity to enable inhibition of crystal growth.

The above-implied layer bearing information recording marks provided in advance is not particularly limitative provided that it is a layer capable of changing the light wave surface by irradiation with light according to the mark information including those having recorded information in the aforementioned recording material and those in which information is recorded by means of fine ruggedness on a substrate as is known in a ROM disk. Particular film materials usable for this purpose include vapor-deposited antimony film exhibiting an increase in the light transmissivity only in the irradiated areas when irradiated with a convergent light beam and a silver oxide film in which fine silver particles are precipitated to serve as a light-scattering body in the light-irradiated areas only.

When the periodical structure is formed by lamination by using materials having different refractive indices, each of the materials should desirably has a transmissivity as high as possible to the light used in addition to the requirement for susceptibility to easy lamination. An example of a suitable combination of such materials is a combination of zinc sulfide ZnS having a refractive index of 2.35 and magnesium fluoride $MgF_2$ having a refractive index of 1.38. When these materials are used for lamination, a multilayered thin film can be formed on the surface of a substrate by the vacuum sputtering vapor-deposition method according to a known procedure. With regard to the effective film thickness having sensitivity to light, a periodical structure to correspond to the desired wavelength can be obtained when coincidence is held between the wave-length corresponding to the periodical structure and the film thickness which is the total of the effective film thickness of the respective layers for a single cycle (for $2\pi$) since the effective film thickness is the actual film thickness multiplied by the refractive index.

When the periodical structure is prepared by hologram recording using a coating layer of a photosensitive material on the substrate, the photosensitive material is not limitative provided that a volume-type hologram can be recorded therewith although it is desirable that the material has transmissivity as high as possible to the light used so as to keep stability of the recorded periodical structure. A hologram having a periodical structure in the direction of thickness can be obtained coherent laser beams of parallel plane wave are brought into interference by incidence perpendicularly to both surfaces of the photosensitive layer or interference of the laser beams is effected between an incident beam and a beam reflected at a reflecting mirror disposed on the back surface of the photosensitive layer.

In the present invention, the wavelength of the laser beams used for hologram recording is not identical with the wavelength at which the flat-plate lens may exhibit desired performance so that it is in many cases that such a combination of two kinds of laser beams of different wavelengths cannot be used. A known method used for the adjustment of the reconstructing wavelength of a volume-type hologram applicable here is a method in which the hologram as recorded is infiltrated with a swelling agent such as a higher alcohol to be swollen therewith to such an extent that the desired periodical structure can be obtained.

In the periodical structural part of the inventive flat-plate lens, as is readily presumed from the above-given description of the hologram recording, reconstruction of a parallel plane wave proceeding in the reversed direction can be accomplished at a high reflectivity as a result of perpendicular incidence of light having a wavelength corresponding to the cycle period as a parallel plane wave. Accordingly, an interference filter having sharp selectivity of wavelength can be obtained with the wavelength corresponding to the cycle period as the center wavelength.

When a light source is brought near from a distance instead of a parallel plane wave or, namely, instead of a light from infinite distance, it is presumable that a reflecting regenerated light as if coming from a point at an equal distance in the reverse side of the periodical structure or a diffraction light converging at that point can be observed faintly though with an increased aberration.

On the other hand, with respect to the hologramic interference fringes recorded by the point light sources opposedly placed in the very proximities at both sides of a volume-type hologram recording material, the distances between the interference fringes appearing in the direction of thickness are smaller when closer to the point light source and increased as the distance from the point light source is increased. While one of the light sources can be regenerated with good accuracy by a point light source positioned at the same position as in recording, a great decrease is caused in the intensity and accuracy of the regenerated light as the distance of the light source is increased from the former position.

The starting point of the idea leading to the present invention is a consideration, when the distance between the interference fringes, which is smaller at a closer position to the point light source and larger at a more remote position therefrom, be uniformized irrespective of the positions, of the wavelength or position of the point light source which can minimize the errors. As a result, a discovery was made that the difference of the interference between the point light source and the regenerated image of the point and the periodical structure can be minimized when a point light source of a wavelength slightly shorter than the wavelength corresponding to the periodical structure is placed at a very proximity to the periodical structure so that the point image can be regenerated with a good efficiency.

By using the flat-plate lens of the present invention, not only a conventional propagating light but also a near-field light existing at a proximity of the flat-plate lens can be led to the opposite side of the flat-plate lens. As compared with the case without the flat-plate lens, the near-field light can be propagated to a further distance without increasing the broadness of a point image.

In the recording or retrieving of information by an optical means, the flat-plate lens of the present invention can be used by inserting into the optical path leading to a recording layer from the light source or leading to an optical detector from the recording layer thereby to provide a novel high-density optical recording method as well as an optical recording medium by utilizing the same.

Assuming that the structure for a single cycle is expressed by a k-layered laminated thin film where the i-th layer has a refractive index of $n_i$ and a thickness of $d_i$, then the wavelength $\lambda$ corresponding to the periodical structure is expressed by the equation $$\lambda/2 = n_1 d_1 + n_2 d_2 + \ldots + n_k d_k.$$

Assuming perpendicular incidence of light into a thin film of thickness d and a refractive index of n, the following equation is held for the electric field and magnetic field of the light before and after incidence to the thin film $E_o$, $H_o$, E and H:

$$\begin{pmatrix} E \\ H \end{pmatrix} = \begin{pmatrix} \cos knd & \frac{i}{n}\sin knd \\ in \sin knd & \cos knd \end{pmatrix} \begin{pmatrix} E_0 \\ H_0 \end{pmatrix},$$

where $k = \omega/c = 2\pi/\lambda$.

Taking here a matrix (M) as defined by the following equation, the matrix (M) is intrinsic to this particular thin film and called the characteristic matrix:

$$\begin{pmatrix} \cos knd & \frac{i}{n}\sin knd \\ in \sin knd & \cos knd \end{pmatrix} = (M).$$

If the distribution of the refractive index for a single cycle is expressed by a k-layered laminated thin film, the electric fields before and after the single cycle are given by the following equation where the characteristic matrix of the j-th thin film is taken as $(M_j)$:

$$\begin{pmatrix} E_k \\ H_k \end{pmatrix} = (M_k) \ldots (M_2)(M_1) \begin{pmatrix} E_0 \\ H_0 \end{pmatrix}.$$

As is shown by the following equation, the product of the matrices can be expressed by a matrix of the same type, which is the characteristic matrix of the laminated thin film for a single cycle:

$$(M_k) \ldots (M_2)(M_1) = \begin{pmatrix} A & iB \\ iC & D \end{pmatrix}.$$

Assuming that the number of cycles is m, the characteristic matrix of an m-cycles laminated film is expressed by the m-th power of the characteristic matrix (M) for a single cycle layer, i.e. $(M)^m$. By using this characteristic matrix, it is easy to conduct accurate calculation of the short wavelength end of the attenuation zone. The wavelength to be used in the inventive flat-plate lens is the wavelength very close to the short wavelength end of this attenuation zone and capable of giving a high transmissivity.

When the characteristic matrix (M) for a single cycle is expressed by the following formula, the short wavelength end of the attenuation zone can be obtained as a wavelength approximately satisfying the equation $(A+D)=-2$, which is a value independent on the number of cycles:

$$\begin{pmatrix} A & iB \\ iC & D \end{pmatrix}.$$

When the periodical structure consists of two layers including a first layer having a refractive index n1 and a thickness d1 and a second layer having a refractive index n2 and a thickness d2, an almost accurate short wavelength end of the attenuation zone can be obtained by utilizing the approximate expression from the characteristic matrix for a single cycle described above within the range where the ratio $(n2 \times d2)/(n1 \times d1)$ is from about 0.1 to about 10. When this ratio is 0.01 or smaller or 100 or larger, however, a wave-length value of $0.95\lambda$ or $1.01\lambda$, respectively, is obtained by a more detailed calculation assuming $\lambda$ as the wavelength for the periodical structure of a single cycle. It would not be a practical case, however, that one of the two layers has a thickness extremely smaller than the other layer. FIG. 1 is a graphical showing of the short wavelength end by the ratio to the wavelength $\lambda$ corresponding to the periodical structure under various conditions.

Figure 2:
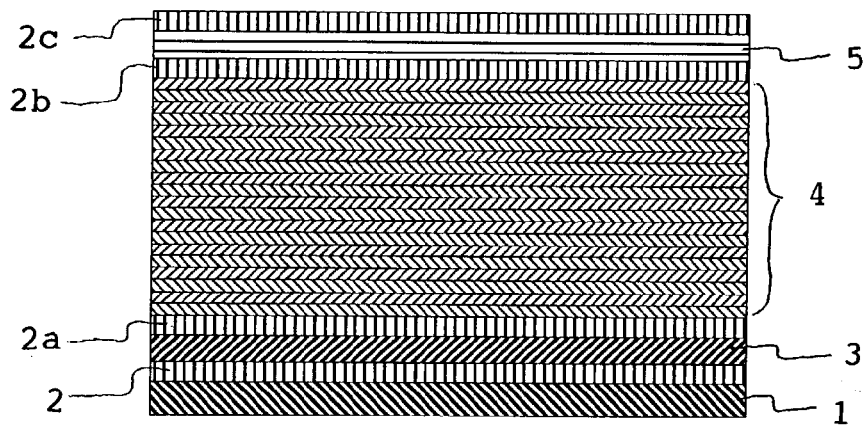
FIG. 2 is an enlarged cross sectional view of the inventive flat-plate lens.

FIG. 2 is an enlarged cross sectional view showing the structure of a typical optical recording medium utilizing the inventive flat-plate lens. The optical recording medium has a laminated structure consisting of a substrate 1 and layers successively formed thereon including a protective layer 2, recording layer 3, protective layer 2a, flat-plate lens layer 4, protective layer 2b, transmission-controlling layer 5 and protective layer 2c. This optical recording medium is an example having a transparent or opaque substrate provided thereon with a recording layer of an amorphous material sandwiched by protective layers and further thereon with the flat-plate lens layer and a transmission-controlling layer sandwiched by protective layers. Recording is made by image formation, in the recording layer, of the light coming from the minute light transmitting part formed in the transmission-controlling layer by irradiation of light.

In retrieving, the recorded images in the recording layer are image-formed on the transmission-controlling layer by means of the flat-plate lens so that the information can be read out through the minute light-transmitting part formed by irradiation with light. The performance of the respective layers excepting the flat-plate lens and the principle of information recording and retrieving are the same as in the Super-RENS described in Japanese Patent Kokai 11-250493 and Applied Physics Letters, volume 73, page 2078 (1998).

In the following, the present invention is described in more detail by way of Examples, which, however, never limit the scope of the invention in any way.

EXAMPLE 1

The substrates used here were plates of plastic resins or metals having a surface of good planarity of high accuracy. A 0.5 mm thick copper plate was used in this Example as the substrate. On the mirror-polished surface of the copper plate, a protective film of SiN was formed in a thickness of 100 nm followed by alternate film formation of each 10 layers of $MgF_2$ and ZnS, each layer having a thickness of 60 nm. A 100 nm thick second protective layer of SiN was formed thereon. The procedure for the film formation of these layers was conducted without intermission by using a vacuum film-forming apparatus. The layers of $MgF_2$ and ZnS were formed by using $MgF_2$ and ZnS, respectively, as the target. The inert gas atmosphere of the chamber during film formation was controlled at a pressure of 0.5 Pa. The SiN layers were formed by the reactive sputtering method using an Si target in an atmosphere of a mixture of argon and nitrogen gases.

Figure 3:
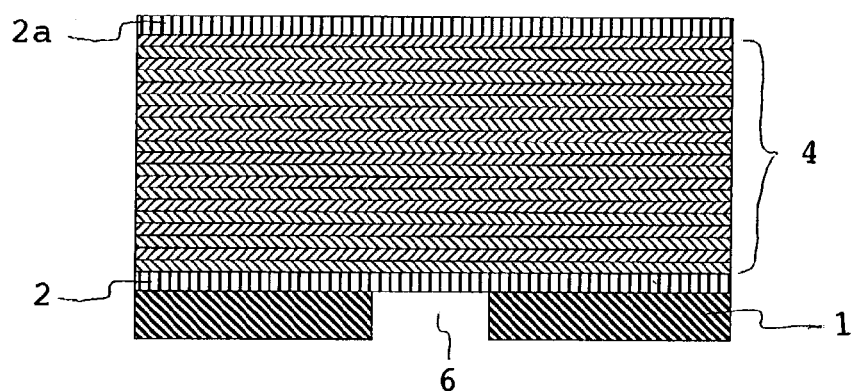
FIG. 3 is an enlarged cross sectional view of the inventive flat-plate lens prepared in Example 1.

In the next place, a part of the copper substrate was etched away from the back surface by using an aqueous iron(III) chloride solution to have the laminated layer exposed bare. With an object to regulate the form of the thus exposed portion, photolithographic masking was undertaken by using a photoresist composition. A window of a dimension of several micrometers to 100 micrometers could be easily formed in the copper substrate in this way leaving the laminated layer of the flat-plate lens intact. FIG. 3 shows an enlarged cross sectional view of the thus formed flat-plate lens according to the invention.

By using the light beams of 390 nm wavelength as the second-order light of the laser beams of 780 nm wavelength emitted from a titanium sapphire laser, the near-field image of a minute body deposited on the surface of the window portion was image-formed on the opposite side through the flat-plate lens and detected by scanning with an optical probe. Alternatively, detailed information was obtained of the minute body deposited in the window portion 6 when detection was made by scanning detection of the image formed on the opposite side through the flat-plate lens with the near-field light emitted from the optical probe.

As is described in the above-given Example, a flat-plate lens can be formed on a tough supporting substrate when the substrate is a plate of a plastic resin or a metal having a surface of highly accurate planarity so that the functional performance of the flat-plate lens per se can be utilized through the open window formed in the substrate. As is described in the above, furthermore, when observation of a minute body deposited in the window portion is desired, scanning detection from remote can be undertaken through the flat-plate lens even if the body side is under an environment not suitable for probe scanning detection such as vacuum, solution and the like.

The protective layers of SiN in the present invention play a role as a separator layer to ensure uniformity of the distance between the body and the flat-plate lens or between the optical probe and the flat-plate lens. While it is possible to adjust the image-forming characteristics of the flat-plate lens by modifying the film thickness of the separator layer, the film thickness can hardly be modified after completion of the film formation. When the light source is a laser of variable wavelength such as the titanium sapphire laser, the image-forming characteristics of the flat-plate lens can be optimized by fine adjustment of the wavelength with the distance between the optical probe and the flat-plate lens kept constant.

EXAMPLE 2

Figure 4:
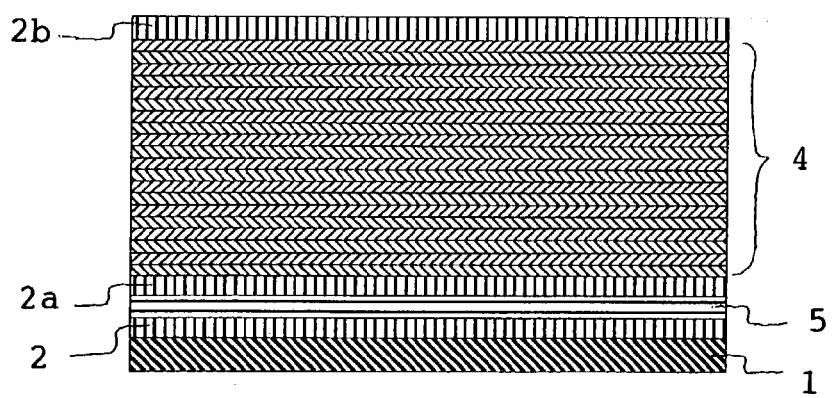
FIG. 4 is an enlarged cross sectional view of the inventive flat-plate lens prepared in Example 2.

A 100 nm thick protective layer of SiN was formed on a 1 mm thick glass plate having planarity of high accuracy as a substrate followed by successive formation of a 15 nm thick masking layer of Sb and a 10 nm thick protective layer of SiN. Further thereon, each 10 layers of $MgF_2$ and ZnS were alternately formed each in a thickness of 60 nm. Further thereon, a 10 nm thick protective layer of SiN was formed. These film-forming procedures were conducted by using a vacuum film-forming apparatus without intermission. The layers of $MgF_2$ and ZnS were formed with $MgF_2$ and ZnS, respectively, as the targets. The pressure of the inert atmosphere was kept at 0.5 Pa during the film-forming procedures. The layers of SiN were formed by the reactive sputtering method in an atmosphere of a gaseous mixture of argon and nitrogen by using a target of Si. FIG. 4 shows an enlarged cross sectional view of the flat-plate lens prepared in this Example.

In the next place, light beams of 390 nm wavelength as the second-order light of the laser beams of 780 nm wavelength emitted from a titanium sapphire laser were image-formed by focusing onto the Sb masking layer from the substrate side. The area of image formation was heated to cause melting of the Sb layer in the center portion to exhibit increased light transmission. It is possible that the size of this melted portion is smaller by $\frac{1}{5}$ to $\frac{1}{10}$ than the image-formed area by light focusing and the light leaking out from the melted hole is a near-field light. When scanning is made by moving the image-forming focused light, the hole formed by melting also moves and the former hole is cooled and regains the metallic state having high reflectivity. This scanning procedure can produce an equivalent effect to the scanning of an optical probe described in Example 1.

Namely, image-formation of the near-field light leaking out of the hole formed by melting of the masking layer of Sb is effected on the opposite side through the flat-plate lens to detect the information corresponding to the image-forming position of the minute body deposited on the protective layer of SiN in the surface. By a scanning movement of the position of focusing image formation, melting is accomplished in different positions so that detailed information can be obtained on the minute bodies by scanning detection within allover the scanned ranges.

Detection of the information can be performed by a method in which the near-field light leaking out of the hole formed by melting is led to the surface of the SiN protective layer by means of the flat-plate lens and the far-field light generated by the interaction thereof with the minute body deposited on the surface is detected at a rearward position to the body or, alternatively, by a method in which detection is performed of the reflecting light re-transmitted through the flat-plate lens and the hole in the melted portion from the substrate side.

EXAMPLE 3

The substrate used here is a substrate bearing information marks recorded in advance thereon. The information marks recorded in advance implied above are not limitative provided that the light wave front of an irradiation light can be varied in accordance with the recorded marks of the information including a recording material bearing information recorded in advance, a material on which information is recorded by way of fine ruggedness on a substrate as in ROM disks, and others. The information-recorded material used in this Example is a polycarbonate substrate having pit mark ruggedness formed by injection replica-forming method from a fused silica glass plate of good planarity bearing a pit mark pattern formed by the method of electron beam photolithography.

The recording marks were formed in about 20 nm of ruggedness. In order to ensure uniformity of ruggedness, a 100 nm thick protective layer of SiN was first formed on the substrate and each 10 layers of $MgF_2$ layers and ZnS layers each having a thickness of 75 nm were alternately formed thereon. Further thereon, a 100 nm thick protective layer of SiN, a 15 nm thick masking layer of Sb and another 100 nm thick protective layer of SiN were successively formed.

Figure 5:
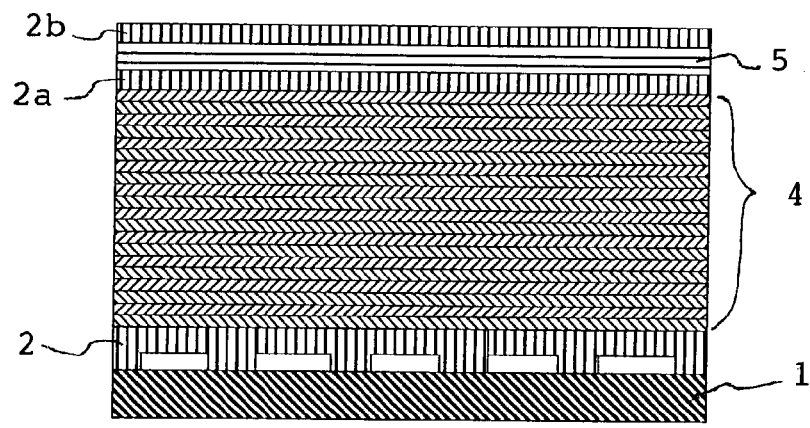
FIG. 5 is an enlarged cross sectional view of the inventive flat-plate lens prepared in Example 3.

These film-forming procedures were all conducted in a vacuum film-forming apparatus without intermission. The $MgF_2$ layers and the ZnS layers were formed by using $MgF_2$ and ZnS, respectively, as the target. The pressure of the inert gaseous atmosphere during the film-forming procedure was kept at 0.5 Pa. Film-formation of the SiN layers was performed by the reactive sputtering method by using an Si target in an atmosphere of a gaseous mixture of argon and nitrogen. FIG. 5 shows an enlarged cross sectional view of the flat-plate lens prepared in this Example.

The substrate assembly bearing the thus formed flat-plate lens and a masking layer on a substrate having information marks recorded in advance was rotated at a linear velocity of 6 m/second and incidence of an argon ion laser beam of 488 nm wavelength was made from the protective layer side. In this time, image formation was made in the Sb masking layer with a numerical aperture of the lens set at 0.6. The near-field light leaking out of the hole formed in the melted portion of the Sb masking layer was image-formed on the information recording marks through the flat-plate lens. The reflecting light after modulation in accordance with the recorded information marks was detected after passing again through the hole at the melted portion of the Sb masking layer. With incidence of 1.0 mW, signals of 30 MHz corresponding to a mark size of 100 nm could be detected with a C/N larger than 30 db.

When the substrate is made of a plastic resin such as a polycarbonate resin as in this Example, it is optional that, in order to protect the substrate against heating by irradiation with laser beams, to have intervention of a thin metal layer between the substrate and the protective layer. This means is effective also for increasing the reflecting signal light.

EXAMPLE 4

An optical recording medium was prepared by providing a recording layer in place of the marks for information recording in advance in Example 3. A 1 mm thick glass substrate of good surface planarity was provided thereon with a 100 nm thick protective layer of SiN followed by successive film formation thereon of a 50 nm thick recording layer of a GeSbTe alloy in an atomic ratio of 2:2:5, a 10 nm thick protective layer of SiN, each 10 alternate layers of $MgF_2$ and ZnS each having a thickness of 75 nm, a 10 nm thick protective layer of SiN, a 15 nm thick masking layer of Sb and, finally, a 100 nm thick protective layer of SiN.

Figure 6:
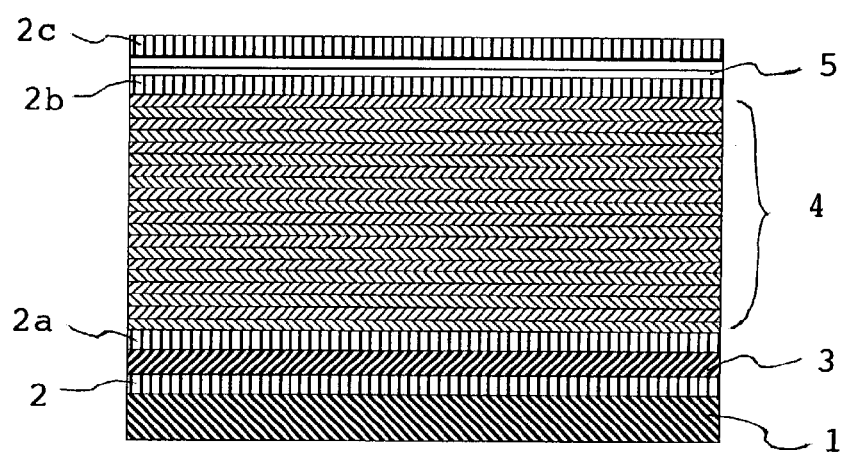
FIG. 6 is an enlarged cross sectional view of the inventive optical recording medium prepared in Example 4.

These film-forming procedures were all conducted in a vacuum film-forming apparatus without intermission. Film-formation of the $MgF_2$ layers and ZnS layers was performed by using $MgF_2$ and ZnS, respectively, as the targets. The pressure of the inert gas atmosphere during the film-forming procedure was kept at 0.5 Pa. The SiN layers were formed by the reactive sputtering method using an Si target in an atmosphere of a gaseous mixture of argon and nitrogen. FIG. 6 shows an enlarged cross sectional view of the optical recording medium prepared in this Example.

The thus prepared optical recording medium was heated and kept standing for 10 minutes at 150° C., which was slightly higher than the crystallization temperature, followed by cooling down to room temperature to confirm conversion of the recording layer to a crystalline state from the changes in the reflectivity. In the next place, pulse-wise irradiation of the recording medium was effected with light beams of 488 nm wavelength from a 1 W argon ion laser at the substrate side to heat the recording layer up to a temperature instantaneously exceeding the melting temperature followed by causing super-cooling utilizing the repose times of the pulses so that the recording layer was confirmed to be subjected to another phase change from the crystalline state to an amorphous state. The reflectivity in this time was higher than the reflectivity in the as-deposited condition immediately after preparation of the recording medium but lower than the reflectivity in the aforementioned crystalline state.

While under rotation at a linear velocity of 6 m/second, this optical recording medium was irradiated at the protective layer side with argon ion laser beams of 488 nm wavelength. Image formation was made here in the Sb masking layer with a numerical aperture 0.6 of the lens. The near-field light leaking out of the hole formed by melting of the Sb masking layer was image-formed in the recording layer through the flat-plate lens. Recording was made by modulation of the laser power with a single signal of 30 MHz corresponding to a mark length of 100 nm. The laser power for recording was 10.0 mW at the moment of pulse-on.

While under rotation at a linear velocity of 6 m/second, the optical recording medium having the information marks recorded as above was irradiated at the protective layer side with argon ion laser beams of 488 wavelength. In this time, image formation was made in the Sb masking layer with a numerical aperture 0.6 of the lens. The near-field light leaking out of the hole formed by melting in the Sb masking layer was image-formed on the information recording marks in the recording layer through the flat-plate lens. The reflecting light modulated in accordance with the marked information was detected by again passing the melt hole in the Sb masking layer. With an incidence light of 1.0 mw, signals of 30 MHz corresponding to a mark size of 100 nm could be detected with a C/N value larger than 30.

EXAMPLE 5

A 1 mm thick glass substrate of good surface planarity was provided on the surface with a 100 nm thick protective layer of SiN followed by successive formation of a 50 nm thick recording layer of a GeSbTe alloy in an atomic ratio of 2:2:5 and a 10 nm thick protective layer of SiN. Separately, another 1 mm thick glass substrate was provided on the surface with a 100 nm thick protective layer of SiN followed by successive formation of a 15 nm thick masking layer of Sb and a 10 nm thick protective layer of SiN. These film-forming procedures were conducted all in a vacuum film-forming apparatus.

A substrate provided thereon with a masking layer of Sb was coated with an aqueous solution of gelatine in such a coating amount that the gelatine film formed by drying and a hardening treatment at 100° C. for 10 minutes had a thickness of about 10 μm. The gelatine coating film was converted to a bichromic acid-containing gelatine film by dipping in an aqueous bichromic acid solution until sufficient absorption of bichromic acid followed by water rinse and drying.

The above was vertically irradiated with parallel beams of 488 nm wavelength from an argon laser to effect light-exposure recording of a volume-type hologram (Rippman type) together with the reflecting light from the Sb layer. After the light exposure, the gelatine layer was again hardened at 100° C. for 30 minutes. After swelling by keeping for 5 minutes in running water, a development treatment was undertaken by dipping for 10 minutes in a 70% aqueous solution of isopropyl alcohol followed by full drying at 100° C. for 60 minutes.

When the parallel light beams of 488 nm wavelength used in the hologram recording were to be used for image-formation by the flat-plate lens, the gelatine layer was swelled by dipping in an aqueous solution of D-sorbitol. The hologram lattice distance could be controlled by modifying the concentration of the D-sorbitol solution. In particular, the concentration of the aqueous D-sorbitol solution was gradually increased to find out the turning point from the state of high reflectivity to a state of high transmissivity under vertical incidence of the 488 nm beams.

Figure 7:
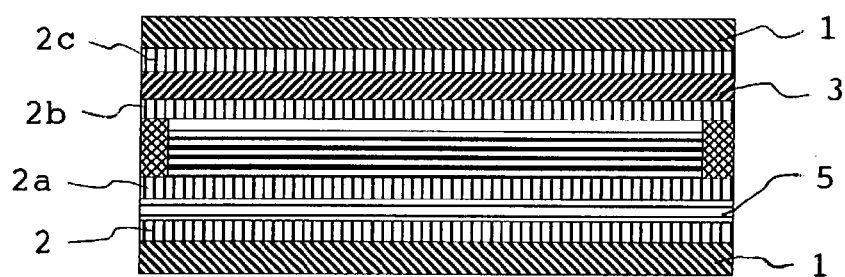
FIG. 7 is an enlarged cross sectional view of the inventive optical recording medium prepared in Example 5.

The substrate bearing the recording layer prepared as above was brought into direct contact with the thus obtained hologram. In order to keep constancy of the hologram lattice distance over a long term, the peripheral portions of the substrate were consolidated with an adhesive. The optical recording medium prepared in this Example was similar to that prepared in Example 4. FIG. 7 shows an enlarged cross sectional view of the optical recording medium prepared in this Example.

What is claimed is:

1. An optical recording medium having a layered structure which comprises a substrate, an optical recording layer and a flat-plate lens utilizing a thin film layer having a periodical structure corresponding to a wavelength slightly longer than the wavelength used for information recording.

2. The optical recording medium according to claim 1 wherein the flat-plate lens has a periodical structure corresponding to a wavelength slightly longer than the wavelength used for information recording, in which the periodicity of the periodical structure is along the direction of thickness of the flat-plate lens.

3. The optical recording medium according to claim 2 in which the periodical structure is an alternate laminating repetition of films made on a substrate from at least two kinds of substances having different refractive indices each from the other or the others.

4. The optical recording medium according to claim 3 in which the periodical structure is made from two kinds of substances having different refractive indices which are zinc sulfide ZnS and magnesium fluoride $MgF_2$.

* * * * *